US009262708B2

(12) United States Patent
Gomi

(10) Patent No.: US 9,262,708 B2
(45) Date of Patent: Feb. 16, 2016

(54) LOW-CAPACITY POWER SUPPLY, POWER SUPPLY SYSTEM, AND IMAGE FORMING APPARATUS

(71) Applicant: Brother Kogyo Kabushiki Kaisha, Nagoya-shi, Aichi-ken (JP)

(72) Inventor: Shunsuke Gomi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/289,003

(22) Filed: May 28, 2014

(65) Prior Publication Data

US 2014/0355025 A1 Dec. 4, 2014

(30) Foreign Application Priority Data

May 28, 2013 (JP) ................................ 2013-112265

(51) Int. Cl.

| | |
|---|---|
| ***G06F 3/12*** | (2006.01) |
| ***G06K 15/00*** | (2006.01) |
| ***H02M 1/36*** | (2007.01) |
| ***H02M 7/06*** | (2006.01) |
| *G03G 15/00* | (2006.01) |
| *H02J 9/00* | (2006.01) |
| *H02M 1/00* | (2007.01) |

(52) U.S. Cl.

CPC ............. *G06K 15/4055* (2013.01); *H02M 1/36* (2013.01); *H02M 7/066* (2013.01); *G03G 15/00* (2013.01); *H02J 9/005* (2013.01); *H02M 2001/0032* (2013.01); *Y02B 70/16* (2013.01)

(58) Field of Classification Search

CPC ....................... H02M 3/33507; G06K 15/4055

See application file for complete search history.

(56) References Cited

U.S. PATENT DOCUMENTS

| | | | | |
|---|---|---|---|---|
| 4,600,982 A * | 7/1986 | Graham | H02M 7/2176 | 323/272 |
| 4,910,654 A * | 3/1990 | Forge | H02H 9/001 | 323/908 |
| 5,659,371 A * | 8/1997 | Krause | G06F 1/32 | 345/212 |
| 7,602,158 B1 * | 10/2009 | Iacob | H02M 3/33523 | 307/17 |

(Continued)

FOREIGN PATENT DOCUMENTS

| | | |
|---|---|---|
| JP | H07308065 A | 11/1995 |
| JP | 2001177986 A | 6/2001 |

(Continued)

OTHER PUBLICATIONS

Nov. 19, 2014—(US) Non-Final Office Action—U.S. Appl. No. 14/292,195.

(Continued)

*Primary Examiner* — Ted Barnes

(74) *Attorney, Agent, or Firm* — Banner & Witcoff, Ltd.

(57) ABSTRACT

A system for minimizing damage based on excess current or voltage is described in which a connection between an AC power supply and a smoothing circuit is interrupted. The system may include capacitors and relays located between the AC power supply and a rectifier. By determining that a voltage or current is greater than a threshold level, the relay or relays may be opened. For instance, the increased voltage or current may be due to a failure of one or the capacitors, resulting in a short circuit across the capacitor. By opening the relay or relays, damage due to the excess current or voltage may be prevented from damaging downstream components.

11 Claims, 5 Drawing Sheets

(56) References Cited

U.S. PATENT DOCUMENTS 9,172,308 B2* 10/2015 Shibasaki ......... H02M 3/33523
2003/0005323 A1* 1/2003 Hanley .................... G06F 21/78 713/194
2006/0076240 A1* 4/2006 Neeb ..................... H01M 10/42 205/102
2006/0126368 A1* 6/2006 Rapeanu ............... H02M 7/066 363/89
2006/0209574 A1* 9/2006 Makino ............... H02M 3/3385 363/21.12
2008/0284537 A1 11/2008 Ikenouchi
2010/0238691 A1* 9/2010 Tsai ...................... H02M 7/103 363/126
2012/0038937 A1* 2/2012 Son ........................ G03G 15/80 358/1.1
2012/0293017 A1* 11/2012 Lidsky .................. H02H 3/087 307/126
2013/0031396 A1* 1/2013 Inukai .................. H02M 7/066 713/323

FOREIGN PATENT DOCUMENTS

JP 2009148075 A 7/2009
JP 2010093887 A 4/2010
JP 2013031337 A 2/2013

OTHER PUBLICATIONS

Apr. 6, 2015—(US) Notice of Allowance—U.S. Appl. No. 14/292,195.

Jun. 22, 2015—(US) Notice of Allowance—U.S. Appl. No. 14/292,195.

* cited by examiner

PRINTER 1
PRINT INSTRUCTION
DISPLAY UNIT
IMAGE MEMORY
COMMUNICATION UNIT
CONTROLLER
ASIC
MODE CONTROL CIRCUIT
ROM
RAM
PHOTOSENSITIVE DRUM
CHARGING UNIT
EXPOSING UNIT
DEVELOPING UNIT
TRANSFERRING UNIT
FIXING UNIT
POWER SUPPLY UNIT
4
3b
3a
50
60
70
51
52
2
2a
2b
2c
2d
2e
2f
100
10

60
MODE CONTROL CIRCUIT
P1
P2
P3
P4
P5
P6
70
VDD
SW1
Scp
Sa
53
LED2
PC2
Q2
Sbr
30
Ldc
C4
C3
+5V (OUT2)
D5
Vgd
32
ZD1
CURRENT DETECTING CIRCUIT
41
Idt
RY1
31
D1
CP3
D2
CP1
CP4
CP2
D3
D4
RY2
Pgd
Vgd
C1
C1p1
C1p2
C2
C2p1
C2p2
AC

LOW-CAPACITY POWER SUPPLY, POWER SUPPLY SYSTEM, AND IMAGE FORMING APPARATUS

CROSS-REFERENCE TO RELATED APPLICATION

This application claims priority from Japanese Patent Application No. 2013-112265 filed on May 28, 2013, which is incorporated herein by reference in its entirety.

FIELD OF DISCLOSURE

The disclosure relates to a low-capacity power supply, a power supply system comprising the low-capacity power supply, and an image forming apparatus comprising the power supply system. More specifically, the disclosure relates to a capacitor insulated low-capacity power supply configured to insulate an AC power supply side and a DC output side (load side) with a capacitor.

BACKGROUND

A known capacitor insulated low-capacity power supply is configured to rectify and smooth an AC voltage applied to first and second capacitors, to use the rectified and smoothed voltage as power supply in a power saving mode of an image forming apparatus.

When one of the capacitors experiences a short circuit failure, a higher voltage than desired may possibly be applied from the AC power supply side to the DC output side (load side). Therefore, countermeasures are required to ensure safety of the image forming apparatus when the capacitor has a short circuit failure.

SUMMARY

The disclosure relates to a technique to increase safety with a simple structure when a capacitor insulated low-capacity power supply is used.

In one or more aspects, a connection between an AC power supply and a smoothing circuit is interrupted. The system may include capacitors and relays located between the AC power supply and a rectifier. By determining that a voltage or current is greater than a threshold level, the relay or relays may be opened. For instance, the increased voltage or current may be due to a failure of one or the capacitors, resulting in a short circuit across the capacitor. By opening the relay or relays, damage due to the excess current or voltage may be prevented from damaging downstream components.

BRIEF DESCRIPTION OF THE DRAWINGS

Reference now is made to the following description taken in connection with the accompanying drawings.

DETAILED DESCRIPTION

<First Illustrative Embodiment>

An illustrative embodiment will be described referring to FIGS. 1-4.

1. Description of Printer

Figure 1:
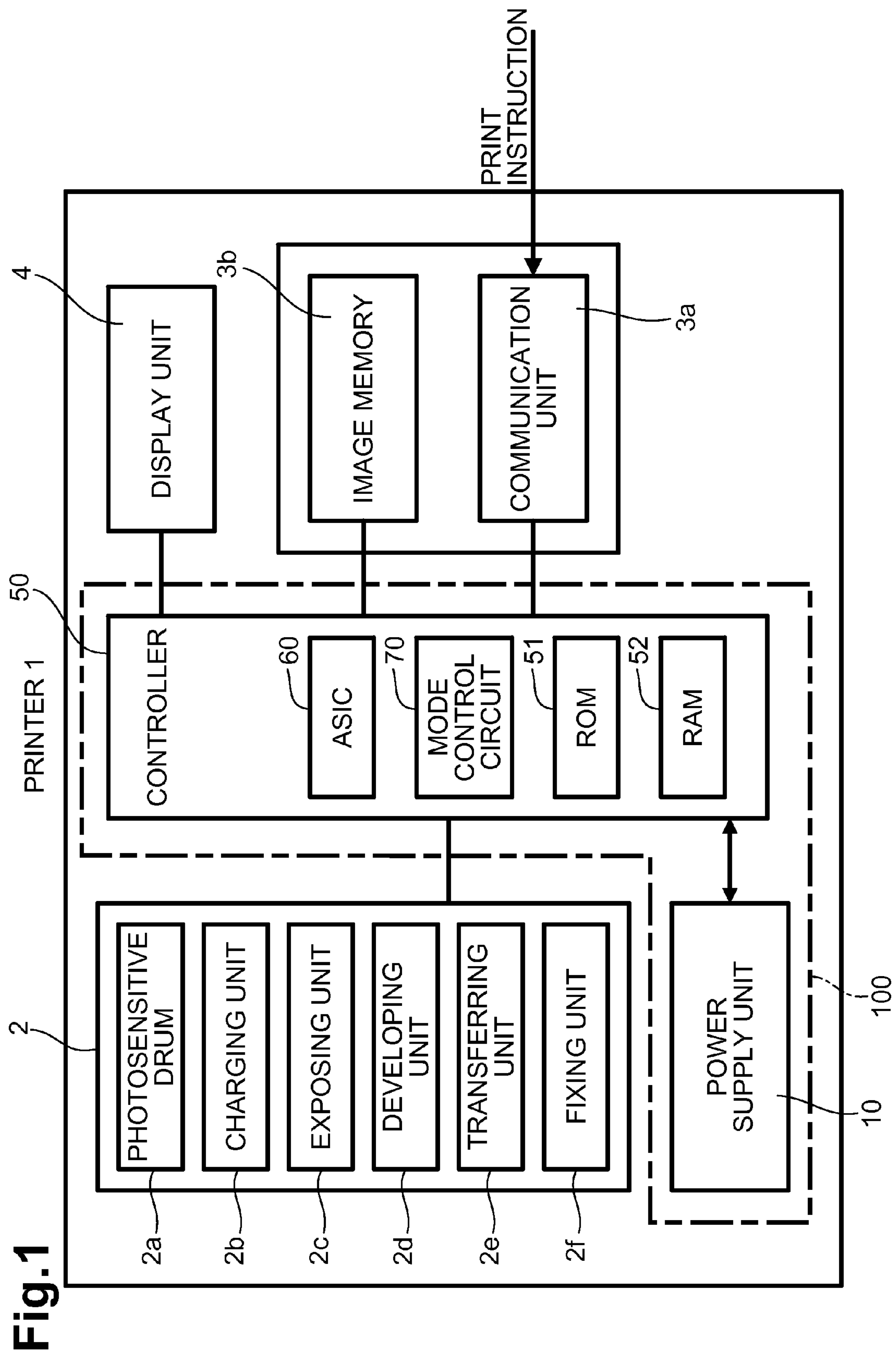
FIG. 1 is a block diagram illustrating configuration of an image forming apparatus according to an illustrative embodiment.

FIG. 1 is a block diagram illustrating an electrical configuration of an image forming apparatus, e.g., a printer 1. The printer 1 may comprise a printing unit 2, a communication unit 3*a*, an image memory 3*b*, a display unit 4, and a power supply system 100. The power supply system 100 may comprise a power supply unit 10 and a controller 50. The power supply unit 10 may function as a power supply of the printer 1. The power supply unit 10 may be configured to supply power to the printing unit 2, the communication unit 3*a*, the image memory 3*b*, the display unit 4, and the controller 50.

The printing unit 2 may comprise a photosensitive drum 2*a*, a charging unit 2*b* configured to perform a charging process of charging a surface of the photosensitive drum 2*a*, an exposing unit 2*c* configured to perform an exposing process of forming an electrostatic latent image on the surface of the photosensitive drum 2*a*, a developing unit 2*d* configured to perform a developing process of attaching a developer onto the electrostatic latent image formed on the surface of the photosensitive drum 2*a* so as to form a developer image, a transferring unit 2*e* configured to perform a transferring process of transferring the developer image onto a recording medium, and a fixing unit 2*f* configured to perform a fixing process of fixing the developer image transferred on the recording medium.

The printing unit 2 may be configured to perform the charging process, the exposing process, the developing process, the transferring process, and the fixing process, thereby performing a printing process of printing print data onto a recording medium. The communication unit 3*a* may be configured to perform communication with an information terminal device, e.g., a personal computer (PC). The communication unit 3*a* may have a function of receiving print instructions and print data from the information terminal device. The image memory 3*b* may be configured to temporarily store print data received from the information terminal device.

If the communication unit 3*a* receives a print instruction and receives print data from the information terminal device, the controller 50 may control the printing unit 2 to perform the printing process comprising the charging process, the exposing process, the developing process, the transferring process, and the fixing process, so that the printer 1 may print the print data onto a recording medium. The operating voltage of the printing unit 2 may be 24 V. The operating voltage of the communication unit 3*a*, the image memory 3*b*, the display unit 4, and the controller 50 may be 3.3 V.

The printer 1 may have a normal mode and a power saving mode as operation modes. In the normal mode, an output of a switching power supply 20 may be turned on and the printer 1 may perform the printing process immediately in response to a print instruction. Therefore, in the normal mode, the power supply system 100 and the controller 50 may be operating, and energization of the fixing unit 2*f* may be controlled so that the fixing unit 2*f* may be maintained at a temperature at which fixing is possible or a temperature slightly lower than the temperature at which fixing is possible. In the power saving mode, the printer 1 may be placed in a standby state without receiving any print instruction for a predetermined period of time. In the power saving mode, a portion of the power supply system 100 and the controller 50 may be operating, and the fixing unit **2*f* may be in non-energization. The output of the switching power supply 20** may be turned off.

The display unit 4 may be configured to display, for example, print settings and errors and be, for instance, an LCD display, an LED display, and the like.

2. Configuration of Power Supply System

The configuration of the power supply system 100 will be described referring to FIG. 2. The power supply unit 10 of the power supply system 100 may comprise the switching power supply 20 and a low-capacity power supply 30.

The switching power supply 20 may comprise a rectifying/smoothing circuit 21, a control IC 22, a voltage generating circuit 23, a transformer 24, a field effect transistor (FET) Q1, a rectifying/smoothing circuit 25, a voltage detecting circuit 26, and DC-DC converters 27 and 28.

The switching power supply 20 may be configured to rectify and smooth an AC voltage Vac of an AC power supply AC, to generate DC voltages of +24 V, +5 V and +3.3 V in the normal mode. The DC voltage of +24 V (hereinafter, referred to as DC 24 V) may be output from a first output terminal OUT1. The DC voltage of +5 V (hereinafter, referred to as DC 5 V) may be output from a second output terminal OUT2. The DC voltage of +3.3 V (hereinafter, referred to as DC 3.3 V) may be output from a third output terminal OUT3.

The rectifying/smoothing circuit 21 may be a so-called capacitor input type, and may comprise a bridge diode configured to rectify the AC voltage Vac (e.g., 240 V) of the AC power supply AC, and a capacitor configured to smooth the rectified voltage. An output of the rectifying/smoothing circuit 21 may be applied to a primary coil of the transformer 24.

The transistor Q1 may be an N-channel MOSFET. The transistor Q1 may be configured to be turned on or off in response to an on/off signal (PWM signal) given to a gate of the transistor Q1 from an output port OUT of the control IC 22. Accordingly, the primary side of the transformer 24 may oscillate so that a voltage may be induced at a secondary coil of the transformer 24.

The voltage generating circuit 23 may be provided on the primary side of the transformer 24. The voltage generating circuit 23 may be configured to generate a power supply voltage Vcc for the control IC 22 by rectifying and smoothing a voltage induced at an auxiliary coil provided on the primary side of the transformer 24.

The rectifying/smoothing circuit 25 may be configured to rectify and smooth a voltage induced at the secondary coil of the transformer 24, to generate DC 24 V.

The voltage detecting circuit 26 may comprise a photocoupler PC1 (for instance, a light emitting diode LED1). The voltage detecting circuit 26 may be configured to make the light emitting diode LED1 of the photocoupler PC1 emit light in response to the detected level of the DC 24 V output by the switching power supply 20. The photocoupler PC1 may comprise a phototransistor PT1 connected to a feedback port FB of the control IC 22. Therefore, a light signal of the light emitting diode LED1 may be converted into an electric signal by the phototransistor PT1, and the detected value of the output of DC 24 V may be fed back to the feedback port FB of the control IC 22.

The DC-DC converter 27 may be configured to convert DC 24 V into DC 5 V and to output DC 5 V. The DC-DC converter 28 may be configured to convert DC 24 V into DC 3.3 V and to output DC 3.3 V.

The control IC 22 may be configured to control the on/off signal for the transistor Q1 in response to a control pulse signal Scp input to a control input port EN from the controller 50, to control oscillation of the primary side of the transformer 24. In the normal mode, the primary side of the transformer 24 may oscillate to generate respective DC voltages. In the power saving mode, oscillation of the primary side of the transformer 24 may be stopped by stopping output of the on/off signal to the transistor Q1. In other words, in the power saving mode, any DC voltages might not be output from the switching power supply 20. When the printer 1 returns from the power saving mode to the normal mode, the control pulse signal Scp may be input from the controller 50 to the control input port EN, and oscillation of the primary side of the transformer 24 may start in response to the control pulse signal Scp. Thus, the respective DC voltages may be output from the switching power supply 20.

Figure 2:
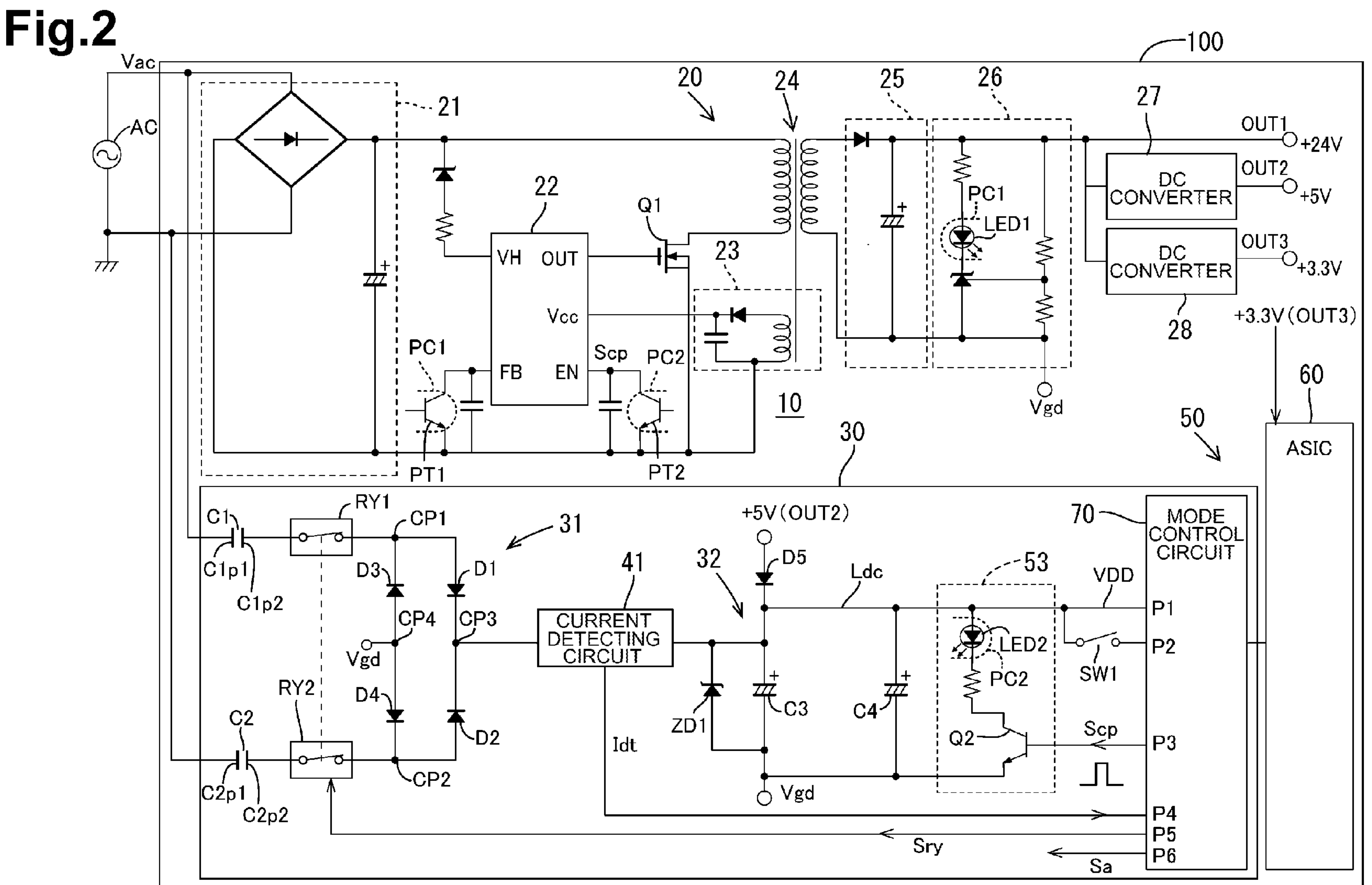
FIG. 2 is a circuit diagram illustrating configuration of a power supply system according to the illustrative embodiment.

As depicted in FIGS. 1 and 2, the controller 50 may comprise an application specific integrated circuit (ASIC) 60, a mode control circuit 70, a read-only memory (ROM) 51, a random-access memory (RAM) 52, and a switching power supply controller 53. The ASIC 60 may be configured to mainly control the printing unit 2 of the printer 1. The mode control circuit 70 may be configured to mainly control the modes of the printer 1.

The mode control circuit 70 may be constituted by a central processing unit (CPU) and a logical circuit, or other ASIC comprising a CPU, than the ASIC 60. In another embodiment, the mode control circuit 70 may be configured as a portion of the ASIC 60.

The ASIC 60 may be configured to receive DC 3.3 V from the DC-DC converter 28 of the switching power supply 20. The ASIC 60 may be configured to operate only in the normal mode with power supply. If the switching power supply 20 shifts into the output stop mode, e.g., the power saving mode, the power supply may be cut off, so that the ASIC 60 may stop.

The mode control circuit 70 may include a port P1 that may be connected to a smoothing circuit 32 of the low-capacity power supply 30. The port P1 may be configured to receive power from the low-capacity power supply 30 in the normal mode and the power saving mode. The mode control circuit 70 may be configured to control switching of the switching power supply 20 between the output mode and the output stop mode in which oscillation of the switching power supply 20 may stop, in response to switching of the modes of the printer 1.

More specifically, the mode control circuit 70 may perform a function of switching the switching power supply 20 between an output mode and an output stop mode by outputting the control pulse signal Scp to the control IC 22. The output mode may be a mode in which the primary side of the transformer 24 may be oscillated, to bring the switching power supply 20 into an output state. The output mode may correspond to the normal mode. The output stop mode may be a mode in which the oscillation of the transformer 24 may be stopped to stop the output of the switching power supply 20. The output stop mode may correspond to the power saving mode. Since the output of the switching power supply 20 is thus stopped in the power saving mode, power may be supplied to the mode control circuit 70 from the low-capacity power supply circuit 30.

The control pulse signal Scp for shifting into the output mode and the output stop mode might not have a distinction with respect to waveform. The control pulse signal Scp with the same pulse width may be set to be output at the time of the mode shifting into the output mode and the output stop mode.

The switching power supply controller 53 may comprise a photocoupler PC2 (for instance, including light emitting diode LED2) and a transistor Q2. An anode of the light emitting diode LED2 may be connected to a power supply line Ldc of the low-capacity power supply 30.

The light emitting diode LED2 may constitute the photocoupler PC2 together with the phototransistor PT2 connected to the control input port EN of the control IC 22 of the switching power supply 20. Therefore, when the control pulse signal Scp is output from the port P3 of the mode control circuit 70 to a base of the transistor Q2, the control pulse signal Scp may be optically transmitted via the photocoupler PC2 and may be input to the control input port EN of the control IC 22.

A user may instruct the mode control circuit 70 to switch modes with a panel switch SW1 of the display unit 4, via the port P2.

3. Structure of Low-Capacity Power Supply

Next, the low-capacity power supply 30 will be described. The low-capacity power supply 30 may have a power supply capacity smaller than that of the switching power supply 20. The low-capacity power supply 30 may be configured to supply power to the mode control circuit 70 and the switching power supply controller 53 in the power saving mode and the normal mode.

The low-capacity power supply 30 may comprise a first capacitor C1, a second capacitor C2, one or more electrically operated switches (e.g., a first latching relay RY1 and a second latching relay RY2), a rectifier 31, a smoothing circuit 32, a storage capacitor C4, a current detecting circuit 41, the switching power supply controller 53, a diode D5, and a mode control circuit 70. The mode control circuit 70 may be an example of an interrupting circuit and a control circuit. The low-capacity power supply 30 may be a capacitor insulated low-capacity power supply comprising the first capacitor C1 and the second capacitor C2. The one or more electrically operated switches might not be limited to the latching relays RY1 and RY2 but may be a normal relay that might not latch or keep its last state when the current is switched off. Further, the one or more electrically operated switches might not be limited to any relays but may be, for example, a semiconductor switch. The current detecting circuit 41, the first and second latching relays RY1 and RY2, and the mode control circuit 70 may constitute the interrupting circuit.

The first capacitor C1 may comprise a first electrode C1p1 and a second electrode C1p2. The first electrode C1p1 may be connected to one end of the AC power supply AC. The second electrode C1p2 may be connected to the rectifier 31.

The second capacitor C2 may comprise a first electrode C2p1 and a second electrode C2p2. The first electrode C2p1 may be connected to the other end of the AC power supply AC. The second electrode C2p2 may be connected to the rectifier 31.

The rectifier 31 may be electrically connected between the second electrode C1p2 of the first capacitor C1 and the second electrode C2p2 of the second capacitor C2. The rectifier 31 may be configured to rectify the AC voltage Vac applied to the capacitors C1 and C2. The rectifier 31 may comprise a first connection point CP1 configured to electrically connect to the second electrode C1p2 of the first capacitor C1 and a second connection point CP2 configured to electrically connect to the second electrode C2p2 of the second capacitor C2.

The rectifier 31 may further comprise a third connection point CP3 configured to electrically connect to the smoothing circuit 32 and a fourth connection point CP4 configured to electrically connect to a reference potential point Pgd.

In the illustrative embodiment, the rectifier 31 may comprise a bridge circuit comprising four diodes D1, D2, D3, and D4. Cathodes of the diodes D1 and D2 may be connected at the third connection point CP3. An anode of the diode D1 may be connected to the second electrode C1p2 of the first capacitor C1, via the first connection point CP1. An anode of the diode D2 may be connected to the second electrode C2p2 of the second capacitor C2, via the second connection point CP2.

Anodes of the diodes D3 and D4 may be connected at the fourth connection point CP4. A cathode of the diode D3 may be connected to the second electrode C1p2 of the first capacitor C1, via the first connection point CP1. A cathode of the diode D4 may be connected to the second electrode C2p2 of the second capacitor C2, via the second connection point CP2. The fourth connection point CP4 may be set to a reference potential Vgd (0 V). The reference potential Vgd may be set to a ground level. In other words, the fourth connection point CP4 may be connected to a frame ground.

The first latching relay RY1 may be provided between the first capacitor C1 and the first connection point CP1. The second latching relay RY2 may be provided between the second capacitor C2 and the second connection point CP2. The first latching relay RY1 and the second latching relay RY2 may be configured to interrupt the electrical connection between the AC power supply AC and the smoothing circuit 32 in response to the control of the mode control circuit 70.

In this case, the AC power supply AC may be interrupted at a stage preceding the rectifier 31. Therefore, when the low-capacity power supply 30 is not connected to a frame ground, the connection between the AC power supply AC and a stage following the rectifier 31 may be reliably interrupted.

The smoothing circuit 32 may be configured to electrically connect to the rectifier 31. The smoothing circuit 32 may be configured to smooth the rectified AC voltage to generate an output voltage of a smoothed voltage VDD. The smoothing circuit 32 may comprise a smoothing storage capacitor C3 and a Zener diode ZD1. The smoothing circuit 32 may be configured to supply power to the mode control circuit 70.

The smoothing storage capacitor C3 and the storage capacitor C4 may be configured to electrically connect to the rectifier 31. Therefore, the smoothing storage capacitor C3 and the storage capacitor C4 may be charged by the rectified voltage of the rectifier 31. The smoothing storage capacitor C3 and the storage capacitor C4 may be configured to electrically connect to the output terminal OUT2 (e.g., +5 V) of the switching power supply 20, via the diode D5. Therefore, when the printer 1 is turned on, the smoothing storage capacitor C3 and the storage capacitor C4 may be charged by the DC voltage of +5 V of the switching power supply 20 and may store a charge therein in a short period of time. Accordingly, even when the operation mode shifts into the power saving mode soon after the printer 1 is turned on, the smoothing storage capacitor C3 and the storage capacitor C4 may have been charged in a short period of time. Therefore, with the power of the smoothing storage capacitor C3 and the storage capacitor C4, the mode may promptly shift from the power saving mode to the normal mode. The diode D5 may be configured to prevent a backward flow of current from the smoothing storage capacitor C3 toward the DC-DC converter 27.

The Zener diode ZD1 may be configured to suppress the smoothed voltage VDD from rising when the AC voltage Vac of the AC power supply AC rises. The Zener voltage of the Zener diode ZD1 may be, for example, 6.2 V.

The current detecting circuit 41 may comprise a circuit comprising, for example, a known current transformer, to detect current. The current detecting circuit 41 may be provided between the rectifier 31 and the smoothing circuit 32. The current detecting circuit 41 may be configured to detect current (e.g., rectified current) output from the rectifier 31, e.g., current flowing into the first latching relay RY1 or the second latching relay RY2. The mode control circuit 70 may be configured to determine a value of the current detected by the current detecting circuit 41 as a current value Idt, via a port P4. In the case where the low-capacity power supply 30 is connected to a frame ground, a rectified current may have a half-wave rectified wave. The rectified current may flow into the current detecting circuit 41 via the first capacitor C1 and the diode D1. In the case where the low-capacity power supply 30 is not connected to a frame ground, the rectified current may have a full-wave rectified wave. The rectified current may further flow into the current detecting circuit 41 via the second capacitor C2 and the diode D2.

The mode control circuit 70 may be configured to interrupt the connection between the AC power supply AC and the smoothing circuit 32 with the first latching relay RY1 and the second latching relay RY2 when the current value Idt satisfies a predetermined condition associated with at least one of the first capacitor C1 and the second capacitor C2 has experienced a short circuit failure. Accordingly, the connection between the AC power supply and a DC output side (load side) may be interrupted.

The predetermined condition associated with at least one of the first capacitor C1 and the second capacitor C2 has experienced a short circuit failure may be, for example, that the current value Idt becomes greater than or equal to a predetermined current value. The predetermined current value may be set to such a current value that may be considered to cause a short circuit failure of the first and second capacitors C1 and C2. Accordingly, when the value of the current flowing into the first latching relay RY1 or the second latching relay RY2 becomes the predetermined current value or greater, the capacitors C1 and C2 may be identified as having experienced a short circuit failure. The predetermined current value may be, for example, an effective value of 100 to (microamperes).

The predetermined condition might not be limited to the above-described example. For example, such a predetermined condition may be set that the current value Idt increases by a predetermined current amount or greater from the normal current value. In this case also, the predetermined current amount may be set to such a current amount that may be considered to cause a short circuit failure of the first and second capacitors C1 and C2. Accordingly, when the current flowing into the first latching relay RY1 or the second latching relay RY2 increases by the predetermined current amount or greater from the normal current, the capacitors C1 and C2 may be identified as having experienced a short circuit failure. The predetermined current amount may be, for example, an effective value of 50 to (microamperes).

The charged power of the storage capacitor C4 may be used for a drive current for the light emitting diode LED2 of the photocoupler PC2 when the mode is switched from the power saving mode to the normal mode. The capacitance of the smoothing storage capacitor C3 and the storage capacitor C4 may be appropriately selected, so that it may be possible to accumulate an amount of power according to the needs for a predetermined voltage in the power saving mode. In the first illustrative embodiment, it may be possible to accumulate an amount of power to reliably drive the light emitting diode LED2 of the photocoupler PC2. Therefore, the switching power supply 20 may be reliably restarted.

The smoothing storage capacitor C3 and the storage capacitor C4 may be an example of a storage circuit. The storage capacitor C4 may be omitted according to an amount of charge power required by the low-capacity power supply 30.

4. Mode Switching Control

Figure 3:
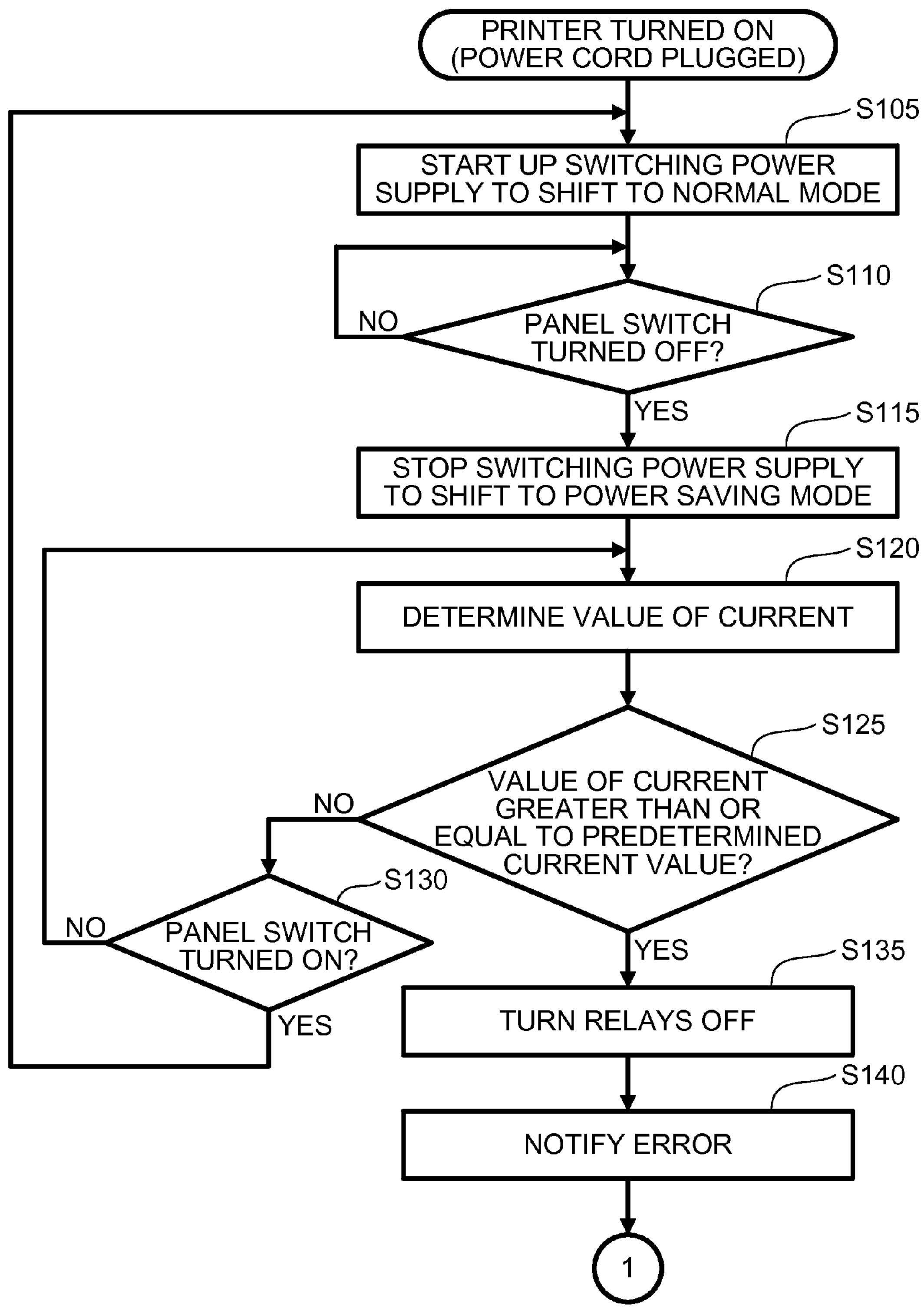
FIG. 3 is a flowchart illustrating mode control processing according to the illustrative embodiment.
Figure 4:
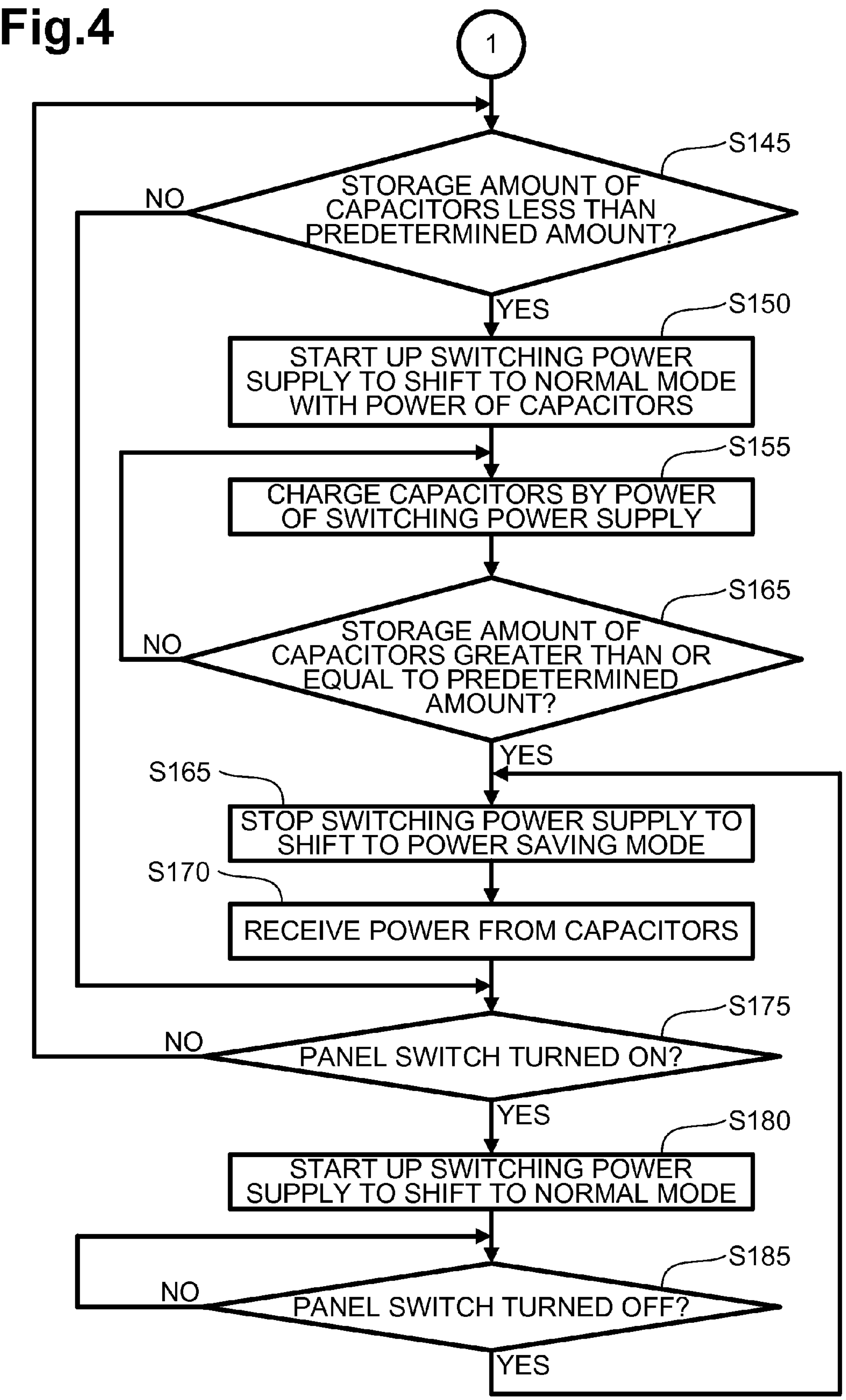
FIG. 4 is a flowchart illustrating mode control processing according to the illustrative embodiment.

Next, mode switching control will be described referring to FIGS. 3 and 4. The mode switching control may be started by the mode control circuit 70 in accordance with a predetermined program, when the printer 1 is turned on. The mode switching control may continue until the printer 1 is turned off For example, when the power cord of the printer 1 is plugged in a socket and the printer 1 is turned on, the mode control circuit 70 may first start up the switching power supply 20 with the control pulse signal Scp, to place the operation mode of the printer 1 in the normal mode (step S105). Then, the mode control circuit 70 may determine whether the panel switch SW1 is turned off to shift the operation mode from the normal mode to the power saving mode (step S110).

When the mode control circuit 70 determines that the panel switch SW1 is not turned off (step S110: NO), determination in step S110 may be continued. When the mode control circuit 70 determines that the panel switch SW1 is turned off (step S110: YES), an operation of the switching power supply 20 may be stopped with the control pulse signal Scp to switch into the power saving mode (step S115: an example of mode switching process). In another embodiment, the operation mode may be switched from the normal mode to the power saving mode without using the panel switch SW1. For example, the operation mode may be switched from the normal mode to the power saving mode when such a situation is continued that the printer 1 does not receive any print data for a predetermined time and the display unit 4 is not operated for the predetermined time.

The mode control circuit 70 may determine the value of the rectified current, e.g., current flowing into the first latching relay RY1 or the second latching relay RY2, detected by the current detecting circuit 41, as the current value Idt (step S120). The mode control circuit 70 may determine whether the value of the detected current, e.g., the current value Idt, is greater than or equal to the predetermined current value (step S125).

When the mode control circuit 70 determines that the value of the detected current is not greater than or equal to the predetermined current value (step S125: NO), e.g., the value of the rectified current is normal, the mode control circuit 70 may determine whether the panel switch SW1 is turned on to switch the operation mode from the power saving mode to the normal mode (step S130).

When the mode control circuit 70 determines that the panel switch SW1 is not turned on (step S130: NO), flow may return to step S120. When the mode control circuit 70 determines that the panel switch SW1 is turned on (step S130: YES), flow may return to step S105 to switch the operation mode to the normal mode.

In step S125, when the mode control circuit 70 determines that the value of the detected current is greater than or equal to the predetermined current value (step S125: YES), e.g., the predetermined condition associated with at least one of the first capacitor C1 and the second capacitor C2 as having experienced a short circuit failure is satisfied, the mode control circuit 70 may supply a relay control signal Sry to the first latching relay RY1 and the second latching relay RY2, via a port P5, to simultaneously turn the first and second latching relays RY1 and RY2 off (step S135: an example of an interrupting process). As the first latching relay RY1 and the second latching relay RY2 are turned off, the electrical connection between the AC power supply AC and the smoothing circuit 32 may be interrupted.

Then, the mode control circuit 70 may generate an error signal Sa to notify such an error that at least one of the first capacitor C1 and the second capacitor C2 is determined as having experienced a short circuit failure. The mode control circuit 70 may supply the error signal Sa to, for example, the display unit 4, via a port P6. The display unit 4 may display information on the error to notify the error (step S140: an example of a notifying process). Thus, a user may be notified of the error that at least one of the first capacitor C1 and the second capacitor C2 is determined as having experienced a short circuit failure, so that safety of the low-capacity power supply 30 may be improved and therefore, safety of the printer 1 may also be improved. An error notification might not be limited to the above-described example. For example, an error may be notified by sound or by blinking a light emitting diode (LED).

The mode control circuit 70 may then determine whether the storage amount of the storage capacitors C3 and C4 is reduced to less than a predetermined amount, for example, from the value of the smoothed voltage VDD (step S145). When the mode control circuit 70 determines that the storage amount of the storage capacitors C3 and C4 is not less than the predetermined amount (step S145: NO), e.g., the value of the smoothed voltage VDD is not reduced to less than, for example, 3.1 V, the storage capacitors C3 and C4 may maintain enough power for driving the light emitting diode LED2 of the photocoupler PC2 to switch from the power saving mode to the normal mode. Flow may proceed to step S175.

When the mode control circuit 70 determines that the storage amount of each storage capacitor C3 and C4 is less than the predetermined amount (step S145: YES), e.g., the value of the smoothed voltage VDD is reduced to less than, for example, 3.1 V, the storage capacitors C3 and C4 may maintain the minimum charge power that may guarantee to drive the light emitting diode LED2 of the photocoupler PC2. The mode control circuit 70 may generate the control pulse signal Scp with power of the storage capacitors C3 and C4 to start up the switching power supply 20 to shift into the normal mode (step S150: an example of a startup process). The storage capacitors C3 and C4 may be charged by the power of the switching power supply 20 (step S155). Thus, the mode control circuit 70 may perform a startup process in step S150 to start up the switching power supply 20 when the detected current value Idt satisfies the predetermined condition during the stop of the switching power supply 20. Therefore, even when power is not supplied from the low-capacity power supply 30 by the interrupting process in step S135, the switching power supply 20 may supply power to the mode control circuit 70.

Then, the mode control circuit 70 may determine whether the storage amount of each storage capacitor C3 and C4 is greater than or equal to the predetermined amount, for example, with the value of the smoothed voltage VDD (step S160). When the mode control circuit 70 determines that the storage amount of each storage capacitor C3 and C4 is not greater than or equal to the predetermined amount (step S160: NO), e.g., the value of the smoothed voltage VDD is not greater than or equal to, for example, 4.5 V, the storage capacitors C3 and C4 might not be charged with enough power to drive the light emitting diode LED2 of the photocoupler PC2, so that flow may return to step S155 in which charging may continue.

When the mode control circuit 70 determines that the storage amount of each storage capacitor C3 and C4 is greater than or equal to the predetermined amount (step S160: YES), e.g., the value of the smoothed voltage VDD is greater than or equal to, for example, 4.5 V, the storage capacitors C3 and C4 may be charged with enough power to drive the light emitting diode LED2 of the photocoupler PC2 and the switching power supply 20 may be stopped with the control pulse signal Scp to shift into the power saving mode (step S165).

Thus, even when power is not supplied to the storage capacitors C3 and C4 from the low-capacity power supply 30 while the switching power supply 20 is stopped due to the interrupting process and the storage amounts of the storage capacitors C3 and C4 are reduced to less than the predetermined amount, the mode control circuit 70 may start up and run the switching power supply 20 until the storage amounts of the storage capacitors C3 and C4 become greater than or equal to the predetermined amounts. Thereafter, the mode control circuit 70 may stop the switching power supply 20 again. Therefore, even when power is not supplied from the low-capacity power supply 30 to the mode control circuit 70 due to the interrupting process, the switching power supply 20 may supply power to the mode control circuit 70 while power saving is achieved.

Then, the mode control circuit 70 may continue to receive power from the storage capacitors C3 and C4 (step S170). The mode control circuit 70 may determine whether the panel switch SW1 is turned on (step S175). When the mode control circuit 70 determines that the panel switch SW1 is not turned on (step S175: NO), flow may return to step S145. When the mode control circuit 70 determines that the panel switch SW1 is turned on (step S175: YES), the mode control circuit 70 may start up the switching power supply 20 to shift into the normal mode (step S180).

Then, the mode control circuit 70 may determine whether the panel switch SW1 is turned off (step S185). When the mode control circuit 70 determines that the panel switch SW1 is not turned off (step S185: NO), determination in step S185 may be continued. When the mode control circuit 70 determines that the panel switch SW1 is turned off (step S185: YES), flow may return to step S165 to shift into the power saving mode, and the operation of the switching power supply 20 may be stopped with the control pulse signal Scp. Steps 5165-5185 may be repeated until the printer 1 is turned off.

5. Effects of First Illustrative Embodiment

When it is considered that a short circuit failure may occur in at least one the first capacitor C1 and the second capacitor C2, the first latching relay RY1 and the second latching relay RY2 may be simultaneously turned off. Accordingly, the connection between the AC power supply AC and the smoothing circuit 32, e.g., the connection between the AC power supply AC (e.g., higher voltage side) and the stage following the rectifier 31 (e.g., lower DC voltage side), may be interrupted. Therefore, safety of the printer 1 when the power supply 30 is used may be improved with a simple structure.

As the first latching relay RY1 and the second latching relay RY2 are simultaneously turned off, notification of an abnormality of the low-capacity power supply 30 may be provided to a user, so that safety of the printer 1 when the low-capacity power supply 30 is used may be improved.

The first latching relay RY1 may be provided between the first capacitor C1 and the first connection point CP1. The second latching relay RY2 may be provided between the second capacitor C2 and the second connection point CP2. In other words, the AC power supply AC may be shut off before a stage preceding the rectifier 31. Therefore, especially when the low-capacity power supply 30 is not connected to a frame ground, e.g., the AC voltage Vac is full-wave rectified, the connection between the AC power supply AC and the stage following the rectifier 31 may be reliably interrupted.

<Second Illustrative Embodiment>

Next, the low-capacity power supply 30 of the power supply system 100 according to a second illustrative embodiment will be described referring to FIG. 5. The second illustrative embodiment may be different from the first illustrative embodiment with respect to the positions where the first latching relay RY1 and the second latching relay RY2 are provided. The differences from the first illustrative embodiment will be described below and detailed description of the similar structure with respect to the second illustrative embodiment may be omitted herein.

Figure 5:
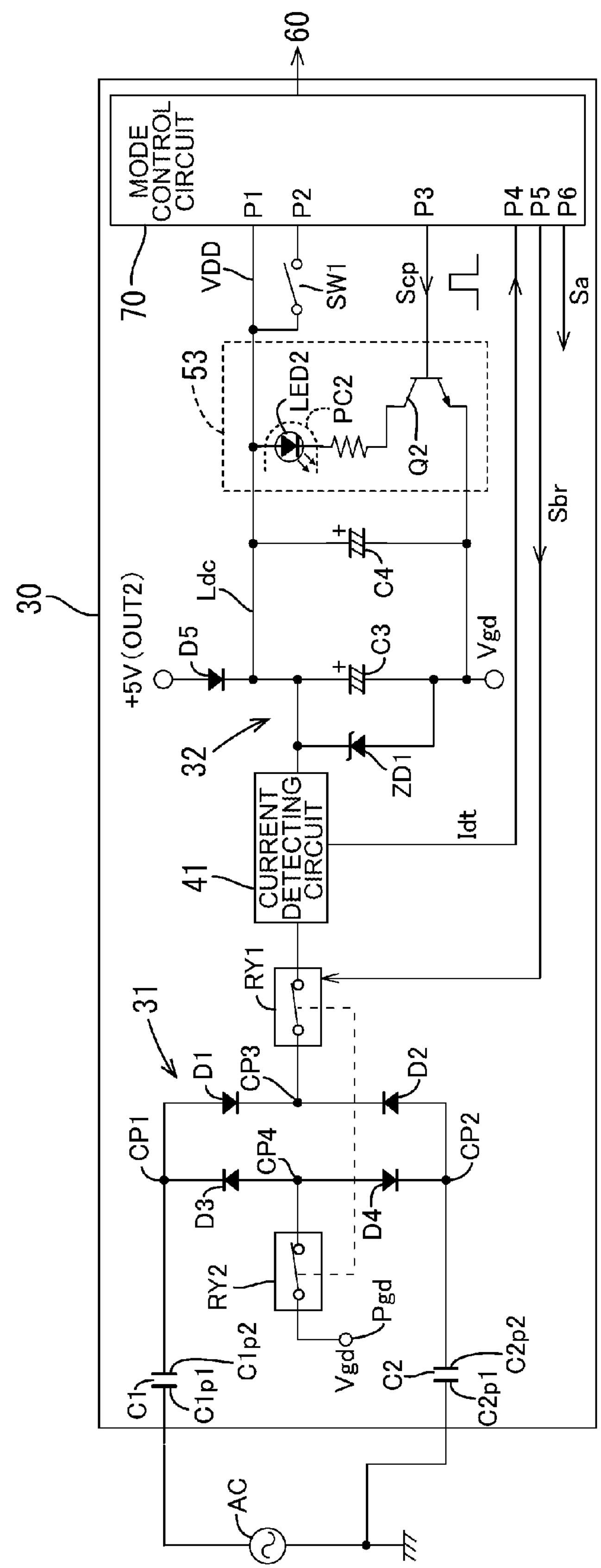
FIG. 5 is a circuit diagram illustrating configuration of a low-capacity power supply according to another illustrative embodiment.

In the second illustrative embodiment, for example, the first latching relay RY1 may be provided between the third connection point CP3 of the rectifier 31 and the smoothing circuit 32, as depicted in FIG. 5. The second latching relay RY2 may be provided between the fourth connection point CP4 of the rectifier 31 and the reference potential point Pgd. The potential of the reference potential point Pgd (e.g., the reference potential Vgd) may be set to a ground level.

For example, in the second illustrative embodiment, the connection between the AC power supply AC and the stage following the rectifier 31 may be reliably interrupted when the printer 1 is connected to a frame ground.

<Another Illustrative Embodiment>

This disclosure might not be limited to the specific embodiments described referring to the drawings, but, for example, the following illustrative embodiments may be included in the technical scope of this disclosure.

(1) In the above-described illustrative embodiments, the interrupting circuit may be constituted by the current detecting circuit 41, the mode control circuit 70, and the first and second latching relays RY1 and RY2 configured to be switched by the mode control circuit 70. However, the disclosure might not be limited thereto. For example, the interrupting circuit may be integrally provided with a current detecting circuit configured to detect a rectified current, one or more electrically operated switches configured to shut off the rectified current, and a control circuit configured to control the electrically operated switches. In this case, the interrupting circuit may alone interrupt the electrical connection between the AC power supply AC and the smoothing circuit 32, without the control of the mode control circuit 70, when a value of the current flowing into the interrupting circuit satisfies the predetermined condition for determining at least one of the first capacitor C1 and the second capacitor C2 has experienced a short circuit failure. When the interrupting circuit is integrally provided with the control circuit separately from the mode control circuit 70, the interrupting circuit may be disposed at positions where the first latching relay RY1 and the second latching relay RY2 are disposed, as depicted in FIGS. 2 and 5. An interrupting operation of each interrupting circuit may be linked.

(2) In the above-described illustrative embodiments, a low-capacity power supply 30 disclosed herein may be applied to the power supply system 100 comprising the switching power supply 20. However, the disclosure might not be limited thereto. For example, the low-capacity power supply 30 may be used independently. In this case, the control circuit might not be limited to the mode control circuit 70, and the switching power supply controller 53 may be omitted.

(3) The power supply system 100 may be applied to an image forming apparatus in the above-described illustrative embodiments. However, the disclosure might not be limited thereto. The power supply system 100 may be applied to other apparatuses having the normal mode and the power saving mode.

(4) In FIG. 2, the first latching relay RY1 is described as connected between capacitor C1 and rectifier 31 and the second latching relay RY2 is described as connected between capacitor C2 and rectifier 31. However, the positions of the latching relays and their associated capacitors may be switched. For instance, capacitor C1 may be connected between first latching relay RY1 and rectifier 31 and capacitor C2 may be connected between the second latching relay RY2 and rectifier 31.

While the disclosure has been described in detail referring to the specific embodiments thereof, this is merely an example, and various changes, arrangements and modifications may be applied therein without departing from the spirit and scope of the disclosure.

What is claimed is:

1. A low-capacity power supply comprising:

a first capacitor having a first electrode and a second electrode, the first electrode being electrically connected to one end of an AC power supply;

a second capacitor having a first electrode and a second electrode, the first electrode being electrically connected to an other end of the AC power supply;

a rectifier connected to the second electrode of the first capacitor and the second electrode of the second capacitor;

a smoothing circuit electrically connected to the rectifier, the smoothing circuit configured to smooth an output from the rectifier; and an interrupting circuit configured to interrupt an electrical connection between the capacitors and the smoothing circuit when a value of current flowing into the interrupting circuit satisfies a predetermined condition, wherein the interrupting circuit comprises:

a current detecting circuit configured to detect the current, a control circuit configured to receive power from the smoothing circuit, and one or more electrically operated switches configured to switch the electrical connection between the AC power supply and the smoothing circuit between an interrupted state and a connected state, and wherein the control circuit is configured to perform an interrupting process in which the electrical connection between the AC power supply and the smoothing circuit is switched to the interrupted state by the one or more electrically operated switches when the value of the current detected by the current detecting circuit satisfies the predetermined condition, and wherein the rectifier comprises a third connection point configured to electrically connect to the smoothing circuit and a fourth connection point configured to connect to a reference potential point, and the one or more electrically operated switches is provided between the third connection point and the smoothing circuit and between the fourth connection point and the reference potential point.

2. The low-capacity power supply according to claim 1, wherein the rectifier comprises a first connection point configured to electrically connect to the second electrode of the first capacitor and a second connection point configured to electrically connect the second electrode of the second capacitor, and the one or more electrically operated switches is provided between the first capacitor and the first connection point and between the second capacitor and the second connection point.

3. The low-capacity power supply according to claim 1, wherein the predetermined condition is satisfied when the value of the current is greater than or equal to a predetermined current value.

4. The low-capacity power supply according to claim 1, wherein the interrupting circuit is configured to perform a notifying process in which an error of a short circuit failure of at least one of the capacitor is notified when the value of the current satisfies the predetermined condition.

5. The low-capacity power supply according to claim 1, wherein the predetermined condition is associated with at least one of the first capacitor and the second capacitor having experienced a short circuit failure.

6. A power supply system comprising:

a low-capacity power supply comprising:

a first capacitor having a first electrode and a second electrode, the first electrode being electrically connected to one end of an AC power supply;

a second capacitor having a first electrode and a second electrode, the first electrode being electrically connected to an other end of the AC power supply;

a rectifier connected to the second electrode of the first capacitor and the second electrode of the second capacitor;

a smoothing circuit electrically connected to the rectifier, the smoothing circuit configured to smooth an output from the rectifier; and an interrupting circuit configured to interrupt an electrical connection between the capacitors and the smoothing circuit when a value of current flowing into the interrupting circuit satisfies a predetermined condition, a switching power supply configured to rectify and smooth the AC voltage of the AC power supply to generate a DC voltage;

a storage circuit configured to store electricity supplied by the low-capacity power supply or the switching power supply; and a storage amount detecting circuit configured to detect a storage amount of the storage circuit, wherein the interrupting circuit is configured to perform a startup process in which the switching power supply is started up when the value of the current satisfies the predetermined condition while the switching power supply is stopped, and wherein when the storage amount is reduced to less than a predetermined amount, the interrupting circuit is configured to permit operation of the switching power supply until the storage amount becomes greater than or equal to the predetermined amount in the startup process.

7. An image forming apparatus comprising:

the power supply system according to claim 6; and an image forming unit configured to form an image using the DC voltage supplied from the switching power supply; and wherein the interrupting circuit is configured to perform a mode switching process in which switching is made between a normal mode in which the switching power supply operates and a power saving mode in which the switching power supply is stopped and power from the low-capacity power supply is used.

8. The power supply system according to claim 6, wherein the rectifier comprises a first connection point configured to electrically connect to the second electrode of the first capacitor and a second connection point configured to electrically connect the second electrode of the second capacitor, and the one or more electrically operated switches is provided between the first capacitor and the first connection point and between the second capacitor and the second connection point.

9. The power supply system according to claim 6, wherein the predetermined condition is satisfied when the value of the current is greater than or equal to a predetermined current value.

10. The power supply system according to claim 6, wherein the interrupting circuit is configured to perform a notifying process in which an error of a short circuit failure of at least one of the capacitor is notified when the value of the current satisfies the predetermined condition.

11. The power supply system according to claim 6, wherein the predetermined condition is associated with at least one of the first capacitor and the second capacitor having experienced a short circuit failure.

* * * * *